(12) United States Patent
Zhao et al.

(10) Patent No.: US 11,852,917 B2
(45) Date of Patent: Dec. 26, 2023

(54) BACKLIGHT MODULE AND PREPARATION METHOD THEREFOR, AND DISPLAY PANEL

(71) Applicant: TCL CHINA STAR OPTOELECTRONICS TECHNOLOGY CO., LTD., Guangdong (CN)

(72) Inventors: Bin Zhao, Guangdong (CN); Juncheng Xiao, Guangdong (CN); Xiaodan Lin, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 103 days.

(21) Appl. No.: 17/605,252

(22) PCT Filed: Aug. 27, 2021

(86) PCT No.: PCT/CN2021/114949
§ 371 (c)(1),
(2) Date: Oct. 21, 2021

(87) PCT Pub. No.: WO2023/019628
PCT Pub. Date: Feb. 23, 2023

(65) Prior Publication Data
US 2023/0058797 A1 Feb. 23, 2023

(30) Foreign Application Priority Data

Aug. 18, 2021 (CN) .......................... 202110948303.6

(51) Int. Cl.
*G02F 1/00* (2006.01)
*G02F 1/13357* (2006.01)

(52) U.S. Cl.
CPC .. *G02F 1/133603* (2013.01); *G02F 1/133605* (2013.01)

(58) Field of Classification Search
CPC ......... G02F 1/133603; G02F 1/133604; G02F 1/133605
See application file for complete search history.

(56) References Cited

U.S. PATENT DOCUMENTS

| 2008/0259240 A1 | 10/2008 | Song et al. |
| 2009/0045416 A1 | 2/2009 | Bierhuizen et al. |

(Continued)

FOREIGN PATENT DOCUMENTS

| CN | 109065529 A | 12/2018 |
| CN | 109445192 A | 3/2019 |

(Continued)

*Primary Examiner* — Gerald J Sufleta, II
(74) *Attorney, Agent, or Firm* — Mark M. Friedman

(57) ABSTRACT

The present invention relates to a backlight module and a preparation method therefor, and a display panel. According to the present invention, solid white ink is attached to a second base plate, and then the solid white ink corresponding to positions of bonding pad units is removed by means of laser engraving, so as to prevent the screen-printing white ink from damaging the second base plate. Aligned assembling is performed on a first assembly and a second assembly using a vacuum pairing device. The vacuum pairing device may be reused in other preparation processes of the display panel. Therefore, the device investment can be reduced, and the production costs can be lowered.

11 Claims, 3 Drawing Sheets

(56) References Cited

U.S. PATENT DOCUMENTS

| | | | |
|---|---|---|---|
| 2019/0206774 A1* | 7/2019 | Rosch | H05K 1/144 |
| 2020/0193895 A1* | 6/2020 | Shao | H05K 1/0274 |
| 2021/0020618 A1* | 1/2021 | Hsu | H01L 25/167 |

FOREIGN PATENT DOCUMENTS

| | | | |
|---|---|---|---|
| CN | 110018593 | A | 7/2019 |
| CN | 110908180 | A | 3/2020 |
| CN | 111276471 | A | 6/2020 |
| CN | 111505868 | A | 8/2020 |
| CN | 112698528 | A | 4/2021 |
| CN | 112712764 | A | 4/2021 |
| CN | 213718310 | U | 7/2021 |
| JP | 2017163029 | A | 9/2017 |

* cited by examiner

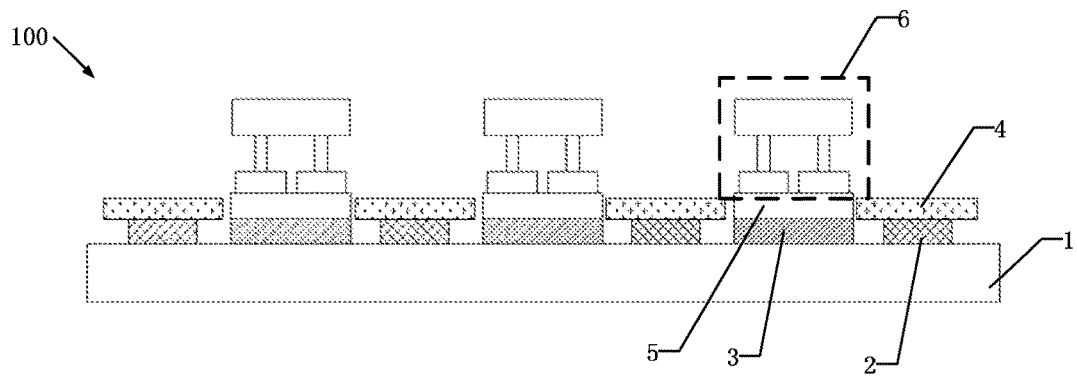

FIG. 1

| | |
|---|---|
| Provide a first base plate, and form, on a surface on a side of the first base plate, a plurality of bonding pad units spaced apart from each other and a plurality of driving units disposed in a same layer as the bonding pad units and alternate with the bonding pad units, wherein the first base plate, the bonding pad units, and the driving units jointly form a first assembly | S1 |
| Provide a second base plate, and form a plurality of reflection units spaced apart from each other on a surface on a side of the second base plate, wherein the second base plate and the reflection units jointly form a second assembly | S2 |
| Perform aligned assembling on the second assembly and the first assembly, wherein the driving units of the first assembly correspond to the reflection units of the second assembly, and the bonding pad units of the first assembly correspond to gaps among adjacent reflection units | S3 |
| Peel off the second base plate | S4 |
| Apply solder pastes to surfaces on sides of the bonding pad units that are away from the first base plate, wherein the solder pastes are in a one-to-one correspondence with the bonding pad units | S5 |
| Dispose light-emitting diodes (LED) on surfaces on sides of the solder pastes that are away from the first base plate, wherein the LEDs are in a one-to-one correspondence with the solder pastes | S6 |

FIG. 2

BACKLIGHT MODULE AND PREPARATION METHOD THEREFOR, AND DISPLAY PANEL

FIELD OF INVENTION

The present disclosure relates to the field of display technologies, and in particular, to a backlight module and a preparation method therefor, and a display panel.

BACKGROUND OF INVENTION

A backlight module is one of key components of a liquid crystal display panel. A function of the backlight module is to supply enough brightness and uniformly distributed light sources, so that the liquid crystal display panel in which the backlight module is located can display images normally. According to different distribution positions of light sources, backlight modules are classified into an edge-lit backlight module and a direct-lit backlight module. In the edge-lit backlight module, light sources in a line form or a point form are disposed on a side of a specially designed light guide plate to form a backlight source. Mesh holes distributed at a bottom of an acrylic light guide plate destroy interference between light, and guide a scattering direction of the light, so that the light is distributed more uniformly, thereby converting a line light source into an area light source. In the direct-lit backlight module, a light source and a printed circuit board are disposed at a bottom of the backlight module. After being emitted from a light source, light passes through a reflector plate at the bottom and then a diffusion plate and a brightness enhancement film on a surface to exit uniformly.

As a new direct-lit backlight module, a mini LED backlight module has various advantages, such as a high brightness, a high contrast, a capability of local dimming display, bendability to special shapes, and a narrow bezel.

SUMMARY OF INVENTION

Technical Problem

For the conventional Mini LED backlight module, white ink is usually prepared before a surface mounted technology (SMT), to increase a reflectivity of the Mini LED backlight module. A conventional white ink preparation technology is generally to screen print white ink or attach solid white ink and then perform exposure and development on the white ink. The screen-printing white ink has poor precision, and a screen-printing steel mesh directly comes into contact with a base plate. A scraper on the screen-printing steel mesh easily scratches or crushes a surface of the base plate or a bonding pad unit, causing a short circuit and a low yield, which is difficult to improve. Since exposure and development materials, coating devices, exposure energy and wavelength, development systems, and the like used for exposure and development and other processes of the liquid crystal display panel after the attachment of solid white ink vary, the above cannot be reused. As a result, device investment of the liquid crystal display panel is large, and production costs are increased. Since the conventional white ink preparation technology has poor precision, a width of a gap between projections of white ink and a bonding pad unit that are adjacent to each other on a base plate is ±150 μm, which is relatively large. As a result, light at the gap is likely to be dark, causing a dark region in the mini LED backlight module, and influencing a display effect.

Technical Solution

The present invention is intended to provide a backlight module and a preparation method therefor, and a display panel, to resolve problems that screen-printing white ink has poor precision, the base plate or the bonding pad unit is easily damaged, an exposure and development device is unable to be reused, production costs are high, and a brightness is non-uniform.

In order to resolve the above problems, the present invention provides a backlight module. The backlight module includes: a first base plate; a plurality of bonding pad units, spaced apart from each other on a surface on a side of the first base plate; a plurality of driving units, disposed in a same layer as the bonding pad units and alternate with the bonding pad units; a plurality of reflection units, disposed on surfaces on sides of the driving units that are away from the first base plate and in a one-to-one correspondence with the driving units. A space between projections of the reflection unit and the bonding pad unit that are adjacent to each other on the first base plate is less than 3 μm.

Further, the backlight module further includes: solder pastes, disposed on surfaces on sides of the bonding pad units that are away from the first base plate and in a one-to-one correspondence with the bonding pad units; and light-emitting diodes (LED), disposed on surfaces on sides of the solder pastes that are away from the first base plate and in a one-to-one correspondence with the solder pastes.

In order to resolve the above problems, the present invention provides a method for preparing the backlight module according to the present invention. The method includes: providing a first base plate; forming, on a surface on a side of the first base plate, a plurality of bonding pad units spaced apart from each other and a plurality of driving units disposed in a same layer as the bonding pad units and alternate with the bonding pad units, wherein the first base plate, the bonding pad units, and the driving units jointly form a first assembly; providing a second base plate; forming a plurality of reflection units spaced apart from each other on a surface on a side of the second base plate, wherein the second base plate and the reflection units jointly form a second assembly; performing aligned assembling on the second assembly and the first assembly, wherein the driving units of the first assembly correspond to the reflection units of the second assembly, and the bonding pad units of the first assembly correspond to gaps among adjacent reflection units; peeling off the second base plate.

Further, steps of preparing the second assembly include: attaching a reflection diaphragm to a surface on a side of the second base plate; removing the reflection diaphragms corresponding to positions of the bonding pad units to form the reflection units spaced apart from each other on the second base plate.

Further, the reflection diaphragms corresponding to the positions of the bonding pad units are removed by means of laser engraving.

Further, the reflection diaphragm is solid white ink.

Further, aligned assembling is performed on the second assembly and the first assembly using a vacuum pairing device.

Further, the second base plate is peeled off by irradiating the second base plate using ultraviolet (UV) light.

Further, the method for preparing the backlight module further includes: applying solder pastes to surfaces on sides of the bonding pad units that are away from the first base plate, wherein the solder pastes are in a one-to-one correspondence with the bonding pad units; and disposing LEDs on surfaces on sides of the solder pastes that are away from the first base plate, wherein the LEDs are in a one-to-one correspondence with the solder pastes.

In order to resolve the above problems, the present invention provides a display panel. The display panel includes the backlight module according to the present invention.

Beneficial Effects

According to the present invention, solid white ink is attached to the second base plate, and then the solid white ink corresponding to the positions of bonding pad units is removed by means of laser engraving, so as to prevent the screen-printing white ink from damaging the second base plate. Aligned assembling is performed on the first assembly and the second assembly using a vacuum pairing device. The vacuum pairing device may be reused in other preparation processes of the display panel. Therefore, the device investment can be reduced, and the production costs can be lowered. The second base plate is removed by means of UV irradiation. The second base plate that is peeled off is not damaged, and therefore may be recycled for use. By means of the laser engraving process having high precision, the space between the projections of the reflection unit and the bonding pad unit that are adjacent to each other on the first base plate after the aligned assembling can be reduced. In this way, the dark region in the prior art is alleviated, and the display effect of the display panel is enhanced.

BRIEF DESCRIPTION OF DRAWINGS

To describe the technical solutions in the embodiments of the present disclosure more clearly, the following briefly describes accompanying drawings required for describing the embodiments. Apparently, the accompanying drawings in the following descriptions show merely some embodiments of the present disclosure, and a person skilled in the art may still derive other accompanying drawings according to these accompanying drawings without creative efforts.

FIG. 1 is a schematic diagram of a structure of a backlight module according to the present invention.

FIG. 2 is a diagram of steps for preparing the backlight module according to the present invention.

REFERENCE NUMERALS

Figure 3:
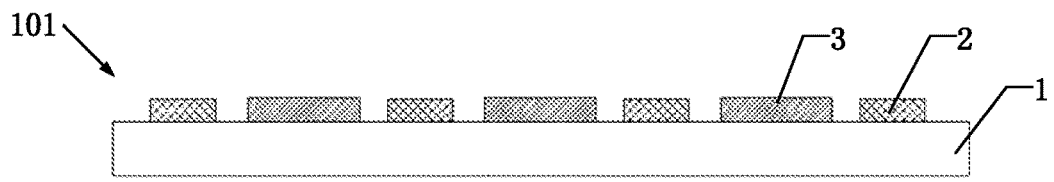
FIG. 3 is a schematic diagram of a structure of a first assembly.

100. Backlight module;
101. First assembly; 102. Second assembly;
1. First base plate; 2. Driving unit;
3. Bonding pad unit; 4. Reflection unit;
5. Solder paste; 6. Light-emitting diode;
7. Second plate; 8. Ultraviolet light;
9. Reflection diaphragm.

DETAILED DESCRIPTION OF PREFERRED EMBODIMENTS

The exemplary embodiments of the present invention are described in detail below with reference to the accompanying drawings, to completely introduce the technical content of the present invention to a person skilled in the art, and demonstrate that the present invention can be implemented by using examples, so that the technical content disclosed in the present invention is clearer, and how to implement the present invention is more comprehensible for a person skilled in the art. However, the present invention can be implemented in various different forms, the protection scope of the present invention is not merely limited to the embodiments mentioned in this specification, and the description of the following embodiments is not intended to limit the scope of the present invention.

The directional terms mentioned in the present invention, for example, "above", "below", "front", "rear", "left", "right", "inside", "outside", and "side" merely refer to directions in the accompanying drawings. The directional terms used in this specification are used for explaining and describing the present invention, and are not intended to limit the protection scope of the present invention.

In the accompanying drawings, components having the same structure are denoted by the same numerals, and components having similar structures or functions are denoted by similar numerals. In addition, for ease of understanding and description, the size and thickness of each component shown in the accompanying drawings are arbitrarily shown, and the present invention is not limited to the size and thickness of each component.

An embodiment provides a display panel. The display panel includes a backlight module 100.

As shown in FIG. 1, the backlight module 100 includes a first base plate 1, driving units 2, bonding pad units 3, reflection units 4, solder pastes 5, and LEDs 6.

In the present embodiment, the first base plate 1 is a glass base plate.

A plurality of bonding pad units 3 are spaced apart from each other on a surface on a side of the first base plate 1. A plurality of driving units 2 are disposed in a same layer as the bonding pad units 3 and alternate with the bonding pad units 3. That is to say, the driving units 2 and the bonding pad units 3 are alternate with each other on the surface on the side of the first base plate 1. That is to say, one driving unit 2 is disposed between two adjacent bonding pad units 3. A gap is formed between each driving unit 2 and each bonding pad unit 3, and each bonding pad unit 3 is electrically connected to each driving unit 2 by using a wire (not shown in the figure).

A plurality of reflection units 4 are disposed on surfaces on sides of the driving units 2 that are away from the first base plate 1 and are in a one-to-one correspondence with the driving units 2. Light emitted by the LEDs 6 are reflected using the reflection units 4, to increase a utilization of the light emitted by the LEDs 6 and a brightness of the backlight module 100. In the present embodiment, a material of the reflection units 4 is solid white ink.

A space between projections of the reflection unit 4 and the bonding pad unit 3 that are adjacent to each other on the first base plate 1 is less than 3 μm. Compared with the prior art, in the present disclosure, the space between the projections of the reflection unit 4 and the bonding pad unit 3 that are adjacent to each other on the first base plate 1 is reduced to be less than 3 µm, which is almost negligible. In this way, a dark region in the prior art is alleviated, and a display effect of the display panel is enhanced.

The solder pastes 5 are disposed on surfaces on sides of the bonding pad units 3 that are away from the first base plate 1 and are in a one-to-one correspondence with the bonding pad units 3. The solder pastes 5 not only can fix the LEDs 6, but also can realize electrical connection between the LEDs 6 and the bonding pad units 3.

The LEDs 6 are disposed on surfaces on sides of the solder pastes 5 that are away from the first base plate 1 and are in a one-to-one correspondence with the solder pastes 5. The LEDs 6 are mainly used as light-emitting sources.

Actually, the backlight module 100 further includes structures, such as an outer frame (not shown in the figure) and an optical diaphragm (not shown in the figure), which are not described herein again.

Figure 4:
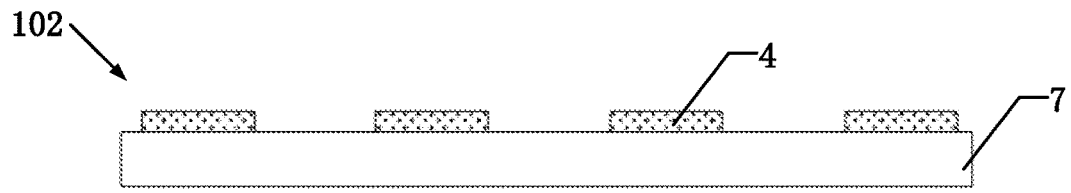
FIG. 4 is a schematic diagram of a structure of a second assembly.
Figure 5:
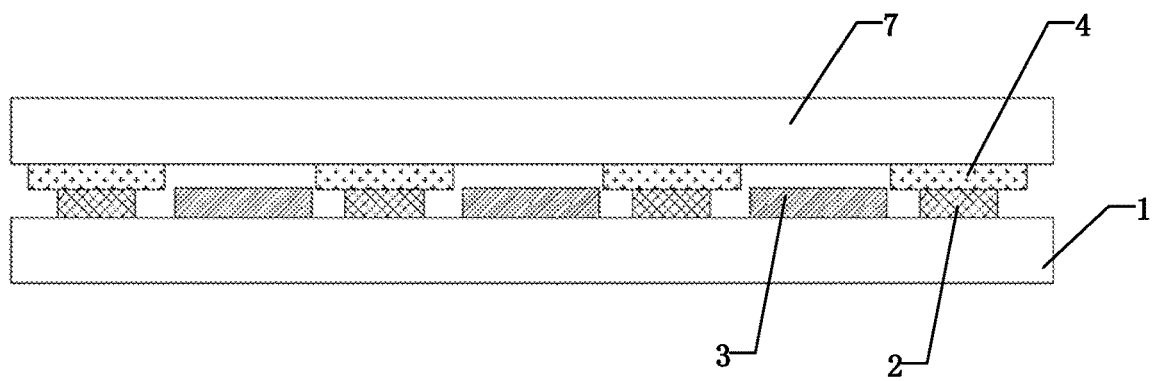
FIG. 5 is a schematic diagram of a structure of the first assembly and the second assembly after aligned assembling.
Figure 6:
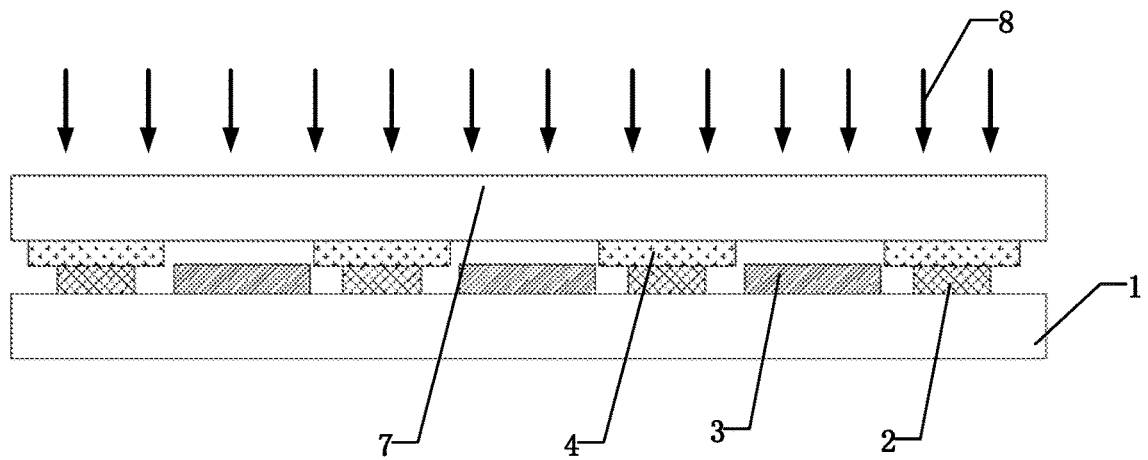
FIG. 6 is a schematic diagram of a structure showing UV irradiation on a second base plate.
Figure 7:
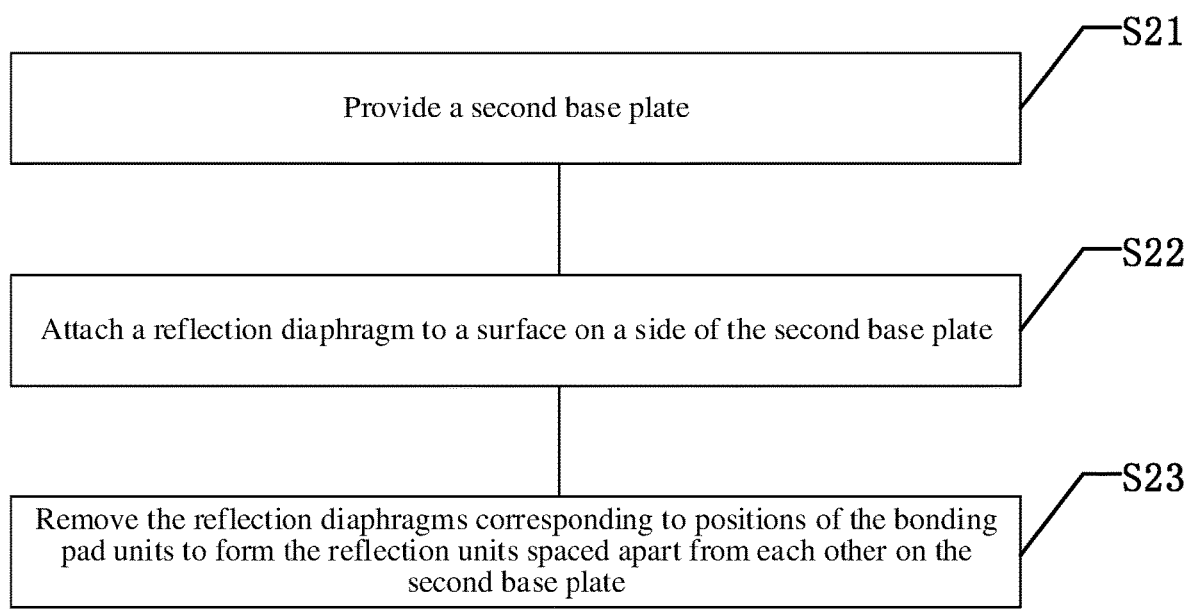
FIG. 7 is a diagram of steps for preparing the second assembly.
Figure 8:
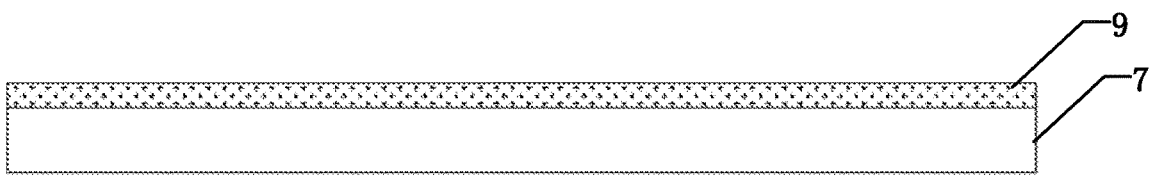
FIG. 8 is a schematic diagram of a structure of the second base plate after a reflection diaphragm is attached thereto.

As shown in FIGS. 2 to 8, an embodiment further provides a method for preparing a backlight module. The method includes steps as bellow. S1: Provide a first base plate 1, and form, on a surface on a side of the first base plate 1, a plurality of bonding pad units 3 spaced apart from each other and a plurality of driving units 2 disposed in a same layer as the bonding pad units 3 and alternate with the bonding pad units, wherein the first base plate 1, the bonding pad units 3, and the driving units 2 jointly form a first assembly 101. S2: Provide a second base plate 7, and form a plurality of reflection units 4 spaced apart from each other on a surface on a side of the second base plate 7, wherein the second base plate 7 and the reflection units 4 jointly form a second assembly 102. S3: Perform aligned assembling on the second assembly 102 and the first assembly 101, wherein the driving units 2 of the first assembly 101 correspond to the reflection units 4 of the second assembly 102, and the bonding pad units 3 of the first assembly 101 correspond to gaps among adjacent reflection units 4. S4: Peel off the second base plate 7. S5: Apply solder pastes 5 to surfaces on sides of the bonding pad units 3 that are away from the first base plate 1, wherein the solder pastes 5 are in a one-to-one correspondence with the bonding pad units 3. S6: Dispose LEDs 6 on surfaces on sides of the solder pastes 5 that are away from the first base plate 1, wherein the LEDs 6 are in a one-to-one correspondence with the solder pastes 5.

In detail, aligned assembling is performed on the second assembly 102 and the first assembly 101 using a vacuum pairing device. The vacuum pairing device may be reused in other preparation processes of the display panel. Therefore, the device investment can be reduced, and the production costs can be lowered.

In detail, the second base plate 7 is peeled off by irradiating the second base plate 7 using UV light 8. The second base plate 7 that is peeled off is not damaged, and therefore may be recycled for use.

In detail, steps of preparing the second assembly 102 include steps as below. S21: Provide a second base plate 7. S22: Attach a reflection diaphragm 9 to a surface on a side of the second base plate 7. S23: Remove the reflection diaphragms 9 corresponding to positions of the bonding pad units 3 to form the reflection units 4 spaced apart from each other on the second base plate 7.

In the present embodiment, solid white ink is attached to the second base plate 7, and then the solid white ink corresponding to the positions of bonding pad units 3 is removed by means of laser engraving, so as to prevent the screen-printing white ink from damaging the second base plate 7. Therefore, the second base plate 7 may be recycled for use after being peeled off later, so that a utilization of the second base plate 7 can be increased, and production costs can be lowered.

In detail, the second base plate 7 is a glass base plate.

In detail, the reflection diaphragms 9 corresponding to the positions of the bonding pad units 3 are removed by means of laser engraving. By means of the laser engraving process having high precision, the space between the projections of the reflection unit 4 and the bonding pad unit 3 that are adjacent to each other on the first base plate 1 after the aligned assembling is reduced to be less than 3 µm, which is almost negligible. In this way, the dark region in the prior art can be alleviated, and the display effect of the display panel can be enhanced.

A backlight module and a preparation method therefor, and a display panel provided in the embodiments of the present disclosure are described above in detail. Although the principles and implementations of the present disclosure are described by using specific examples in this specification, the descriptions of the above embodiments are merely intended to help understand the method and the core idea of the method of the present disclosure. Meanwhile, a person of ordinary skill in the art may make modifications to the specific implementations and application range according to the idea of the present disclosure. In conclusion, the content of this specification is not construed as a limitation on the present disclosure.

What is claimed is:

1. A backlight module, comprising:
   a first base plate;
   a plurality of bonding pad units, spaced apart from each other on a surface on a side of the first base plate;
   a plurality of driving units, disposed in a same layer as the bonding pad units and alternate with the bonding pad units; and
   a plurality of reflection units, disposed on surfaces on sides of the driving units that are away from the first base plate and in a one-to-one correspondence with the driving units;
   wherein a space between projections of the reflection unit and the bonding pad unit that are adjacent to each other on the first base plate is less than 3 µm.

2. The backlight module as claimed in claim 1, further comprising:
   solder pastes, disposed on surfaces on sides of the bonding pad units that are away from the first base plate and in a one-to-one correspondence with the bonding pad units; and
   light-emitting diodes (LED), disposed on surfaces on sides of the solder pastes that are away from the first base plate and in a one-to-one correspondence with the solder pastes.

3. A method for preparing a backlight module, the backlight module comprises:
   a first base plate;
   a plurality of bonding pad units, spaced apart from each other on a surface on a side of the first base plate;
   a plurality of driving units, disposed in a same layer as the bonding pad units and alternate with the bonding pad units; and
   a plurality of reflection units, disposed on surfaces on sides of the driving units that are away from the first base plate and in a one-to-one correspondence with the driving units, wherein a space between projections of the reflection unit and the bonding pad unit that are adjacent to each other on the first base plate is less than 3 µm;

wherein the method comprises:

providing the first base plate; forming, on a surface on a side of the first base plate, the plurality of bonding pad units spaced apart from each other and the plurality of driving units disposed in a same layer as the bonding pad units and alternate with the bonding pad units, wherein the first base plate, the bonding pad units, and the driving units jointly form a first assembly;

providing the second base plate; forming the plurality of reflection units spaced apart from each other on a surface on a side of the second base plate, wherein the second base plate and the reflection units jointly form a second assembly;

performing aligned assembling on the second assembly and the first assembly, wherein the driving units of the first assembly correspond to the reflection units of the second assembly, and the bonding pad units of the first assembly correspond to gaps among adjacent reflection units; and peeling off the second base plate.

4. The method for preparing the backlight module as claimed in claim 3, wherein steps for preparing the second assembly comprise:

attaching a reflection diaphragm to a surface on a side of the second base plate; and removing the reflection diaphragms corresponding to positions of the bonding pad units to form the reflection units spaced apart from each other on the second base plate.

5. The method for preparing the backlight module as claimed in claim 4, wherein the reflection diaphragms corresponding to the positions of the bonding pad units are removed by means of laser engraving.

6. The method for preparing the backlight module as claimed in claim 4, wherein the reflection diaphragm is solid white ink.

7. The method for preparing the backlight module as claimed in claim 3, wherein aligned assembling is performed on the second assembly and the first assembly using a vacuum pairing device.

8. The method for preparing the backlight module as claimed in claim 3, wherein the second base plate is peeled off by irradiating the second base plate using ultraviolet (UV) light.

9. The method for preparing the backlight module as claimed in claim 3, the method further comprising:

applying solder pastes to surfaces on sides of the bonding pad units that are away from the first base plate, wherein the solder pastes are in a one-to-one correspondence with the bonding pad units; and disposing LEDs on surfaces on sides of the solder pastes that are away from the first base plate, wherein the LEDs are in a one-to-one correspondence with the solder pastes.

10. A display panel, comprising a backlight module, wherein the backlight module comprises:

a first base plate;

a plurality of bonding pad units, spaced apart from each other on a surface on a side of the first base plate;

a plurality of driving units, disposed in a same layer as the bonding pad units and alternate with the bonding pad units; and a plurality of reflection units, disposed on surfaces on sides of the driving units that are away from the first base plate and in a one-to-one correspondence with the driving units, wherein a space between projections of the reflection unit and the bonding pad unit that are adjacent to each other on the first base plate is less than 3 μm.

11. The display panel as claimed in claim 10, wherein the backlight module further comprises:

solder pastes, disposed on surfaces on sides of the bonding pad units that are away from the first base plate and in a one-to-one correspondence with the bonding pad units; and light-emitting diodes, disposed on surfaces on sides of the solder pastes that are away from the first base plate and in a one-to-one correspondence with the solder pastes.

* * * * *